US009702747B2

United States Patent
Wang et al.

(10) Patent No.: US 9,702,747 B2
(45) Date of Patent: Jul. 11, 2017

(54) MASS FLOWMETER HAVING TWISTED CARBON NANOTUBE COMPOSITE WIRE SENSING ELEMENTS

(71) Applicant: Beijing FUNATE Innovation Technology Co., LTD., Beijing (CN)

(72) Inventors: Yu-Quan Wang, Beijing (CN); Li Qian, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 265 days.

(21) Appl. No.: 14/693,901

(22) Filed: Apr. 23, 2015

(65) Prior Publication Data

US 2015/0308873 A1   Oct. 29, 2015

(30) Foreign Application Priority Data

Apr. 23, 2014  (CN) .......................... 2014 1 0164333

(51) Int. Cl.
*G01F 1/68* (2006.01)
*G01F 1/69* (2006.01)

(52) U.S. Cl.
CPC ..................................... *G01F 1/69* (2013.01)

(58) Field of Classification Search
None
See application file for complete search history.

(56) References Cited

U.S. PATENT DOCUMENTS

| | | | | |
|---|---|---|---|---|
| 3,333,470 A | * | 8/1967 | Fingerson | ............. F01D 21/003 374/148 |
| 4,393,697 A | * | 7/1983 | Sato | ........................ G01F 5/00 73/114.34 |
| 4,856,330 A | * | 8/1989 | Honda | .................... G01P 13/02 73/170.12 |
| 5,423,213 A | * | 6/1995 | Yajima | .................... G01F 1/684 73/204.26 |
| 8,318,295 B2 | | 11/2012 | Wang et al. | |
| 2008/0170982 A1 | | 7/2008 | Zhang et al. | |
| 2011/0036828 A1 | * | 2/2011 | Feng | ..................... H05B 3/342 219/529 |
| 2011/0051447 A1 | | 3/2011 | Lee | |
| 2011/0095237 A1 | | 4/2011 | Liu et al. | |
| 2011/0155713 A1 | | 6/2011 | Wang et al. | |
| 2015/0309067 A1 | * | 10/2015 | Qian | ........................ G01P 5/12 73/204.27 |

(Continued)

FOREIGN PATENT DOCUMENTS

CN       2178579      10/1994
CN      101437663      5/2009
(Continued)

*Primary Examiner* — Harshad R Patel
(74) *Attorney, Agent, or Firm* — Steven Reiss

(57) ABSTRACT

A temperature-sensitive mass flowmeter includes a detecting element, a signal receiving element, and a signal processing element. The detecting element includes a first sensing element and a second sensing element. The first sensing element and the second sensing element are each a nanotube composite wire. The carbon nanotube composite wire includes a carbon nanotube wire and a metal layer. The carbon nanotube wire includes a plurality of carbon nanotubes spirally arranged along an axial direction of the carbon nanotube wire and the metal layer is coated on a surface of the carbon nanotube wire.

13 Claims, 5 Drawing Sheets

(56) References Cited

U.S. PATENT DOCUMENTS

2015/0310957 A1* 10/2015 Qian ..................... H01B 1/04
                                                    174/126.2

FOREIGN PATENT DOCUMENTS

| CN | 101633500 | 1/2010 |
| CN | 101976594 | 2/2011 |
| CN | 102111926 | 6/2011 |
| CN | 103276486 | 9/2013 |
| CN | 203178958 | 9/2013 |
| TW | 200939249 | 9/2009 |
| TW | 201241843 | 10/2012 |

* cited by examiner

MASS FLOWMETER HAVING TWISTED CARBON NANOTUBE COMPOSITE WIRE SENSING ELEMENTS

CROSS-REFERENCE TO RELATED APPLICATIONS

This application claims priority to Chinese Patent Application No. 201410164333.8, filed on Apr 23, 2014, the disclosure of which is incorporated herein by reference. The application is also related to copending applications entitled, "BINDING WIRE AND SEMICONDUCTOR PACKAGE STRUCTURE USING THE SAME", filed * Apr 23, 2015; "CARBON NANOTUBE COMPOSITE WIRE", filed * Apr 23, 2015; "HOT WIRE ANEMOMETER", filed * Apr 23, 2015; "DEFROSTING GLASS, DEFROSTING LAMP AND VEHICLE USING THE SAME", filed * Apr 23, 2015; "WIRE CUTTING ELECTRODE AND WIRE CUTTING DEVICE USING THE SAME", filed * Apr 23, 2015; "CONDUCTIVE MESH AND TOUCH PANEL USING THE SAME", filed * Apr 23, 2015; "ELECTROMAGNETIC SHIELDING MATERIAL AND CLOTHING USING THE SAME", filed *** Apr 23, 2015.

FIELD

The present disclosure relates to gauges and measuring devices.

BACKGROUND

With the development of industrial production, an accuracy requirement of a flowmeter is high. A working principle of a mass flowmeter is based on the flow rate of a fluid which affects a temperature of a sensing element, thereby changing a resistance of the sensing element, and by measuring the change in the resistance of the sensing element, the flow rate can be measured.

According to the law of resistance, the resistance formula of the sensing element is $R=\rho L/S$, where, $\rho$ is the resistivity of the sensing element, L is the length of the sensing element, S is the cross sectional area of the sensing element. The resistivity $\rho$ is associated with the temperature of the sensing element. When the length of the sensing element is unchanged, the smaller the cross sectional area, the greater will be the resistance of the sensing element as affected by the temperature. Therefore, the smaller a diameter of the sensing element, the higher will be the sensitivity of the sensing element anemometer.

The conventional sensing element is a metal wire. However, when a diameter of the metal wire made of metal or metal alloy is in micrometer size or less, the metal wire is easily broken. Therefore, the sensitivity of the conventional mass flowmeter is bad, and a life of the sensing element is short.

BRIEF DESCRIPTION OF THE DRAWINGS

Implementations of the present technology will now be described, by way of example only, with reference to the attached figures.

DETAILED DESCRIPTION

Figure 1:
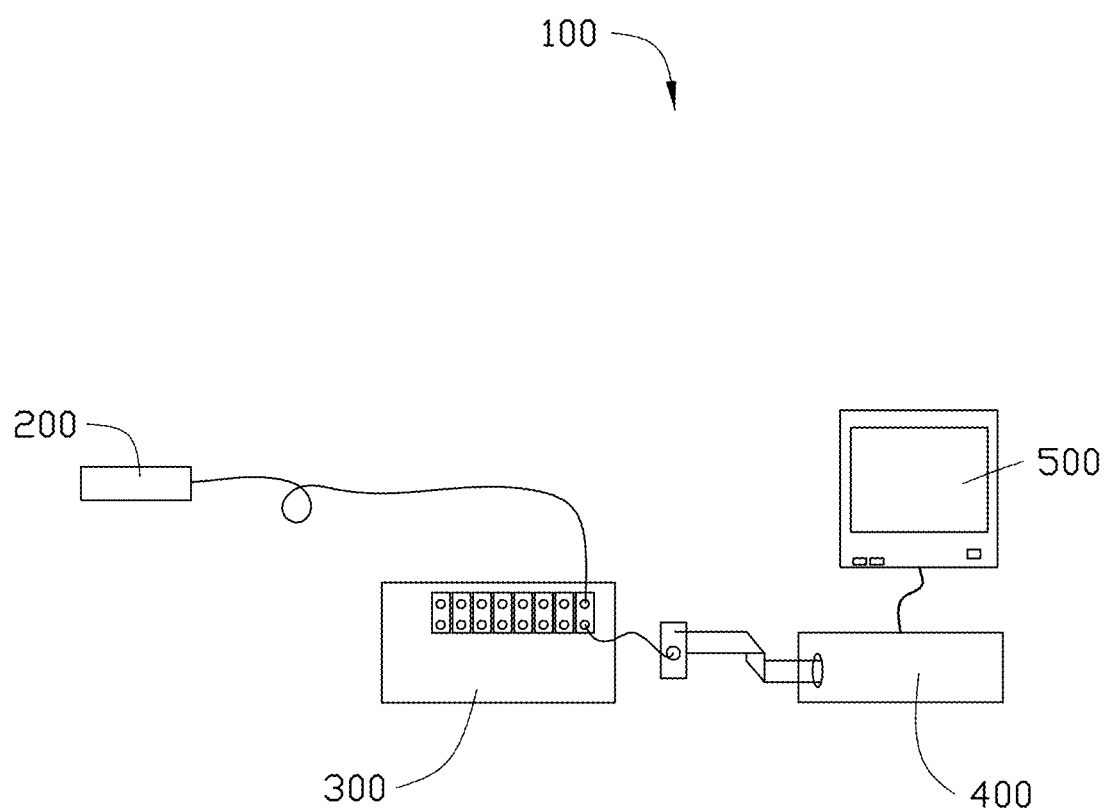
FIG. 1 is a schematic view of an embodiment of a mass flowmeter.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprise" or "comprising" when utilized, means "include or including, but not necessarily limited to"; it specifically indicates open-ended inclusion or membership in the so-described combination, group, series, and the like.

Referring to FIG. 1, a mass flowmeter 100 comprises a detecting element 200, a signal receiving element 300, a signal processing element 400, and a display device 500, electrically connected with each other. The detecting element 200 is used to detect a signal concerning movement of a fluid. The signal receiving element 300 is electrically connected with the detecting element 200. The signal receiving element 300 is used to receive the signal detected by the detecting element 200, and transfer the signal to the signal processing element 400. The signal processing element 400 is used to perform calculations regarding the signal and obtain the flow rate, and display the flow rate by the display device 500.

Figure 2:
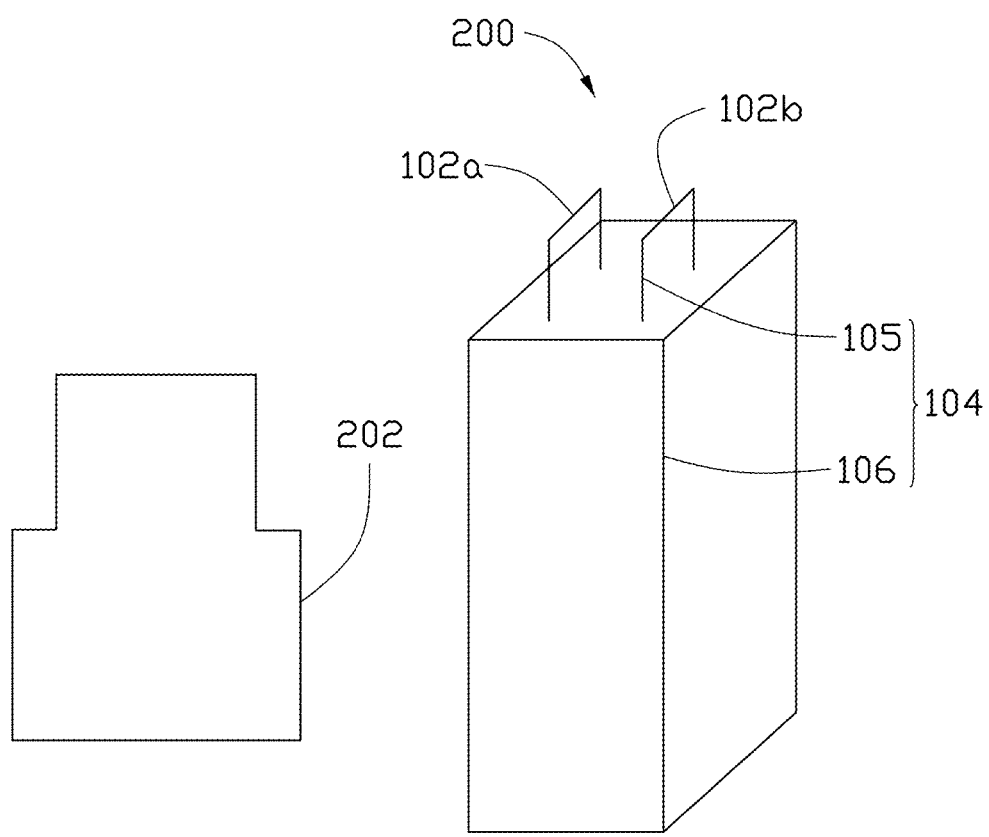
FIG. 2 is a schematic view of an embodiment of a detecting element of the mass flowmeter of FIG. 1.

Referring to FIG. 2, the detecting element 200 comprises a first sensing element 102*a*, a second sensing element 102*b*, and a support structure 104. The first sensing element 102*a* and the second sensing element 102*b* are spaced from each other, and supported by the support structure 104. A material of the first sensing element 102*a* and the second sensing element 102*b* is same. The size of the first sensing element 102*a* and the second sensing element 102*b* is same. Two ends of the first sensing element 102*a* and two ends of the second sensing element 102*b* are respectively fixed to the support structure 104, and suspended by the support structure 104. The first sensing element 102*a* and the second sensing element 102*b* are electrically connected with the signal receiving element 300.

Referring to FIG. 2, the support structure 104 comprises four conductive support rods 105 and one support substrate 106. Each of the four conductive support rods 105 comprises a first end (not shown) and a second end (not shown). The second ends of the four conductive support rods 105 are fixed on the support substrate 106. The first ends of the four conductive support rods 105 extend out from the support substrate 106. Four first ends of the four conductive support rods 105 are spaced from each other. Two ends of the first sensing element 102a are respectively fixed on two first ends of the four conductive support rods 105. Two ends of the second sensing element 102b and are respectively fixed on the other two first ends of the four conductive support rods 105.

The detecting element 200 further comprises a connection wire (not shown). The connection wire is used to electrically connect with the four conductive support rods 105 and the signal receiving element 300. The connection wire is located inside of the support substrate 106.

The conductive support rod 105 is used to support the first sensing element 102a and the second sensing element 102b, and to apply a current to the first sensing element 102a and the second sensing element 102b. A material of the conductive support rod 105 should have good electrical conductivity and a heat transfer coefficient as small as possible, and should also have a certain strength and rigidity. In one embodiment, the conductive support rod 105 is made of gold plated stainless steel wire. A diameter of the conductive support rod 105 ranges from 10 micrometers to 5 millimeters. The four conductive support rods 105 are substantially parallel and spaced from each other.

The support substrate 106 is used to support the conductive support rod 105. A material of the support substrate 106 is an insulating material. In one embodiment, the support substrate 106 is made of ceramic. The four conductive support rods 105 is fixed on the support substrate 106 by sintering.

The detecting element 200 can further comprise a protective cover 202 for protecting the first sensing element 102a and the second sensing element 102b. When the mass flowmeter 100 is not working, the protective cover 202 is used to cover the first sensing element 102a and the second sensing element 102b. The protective cover 202 is mechanically fixed on but easily detached from the support substrate 106 by a mechanical method.

Figure 3:
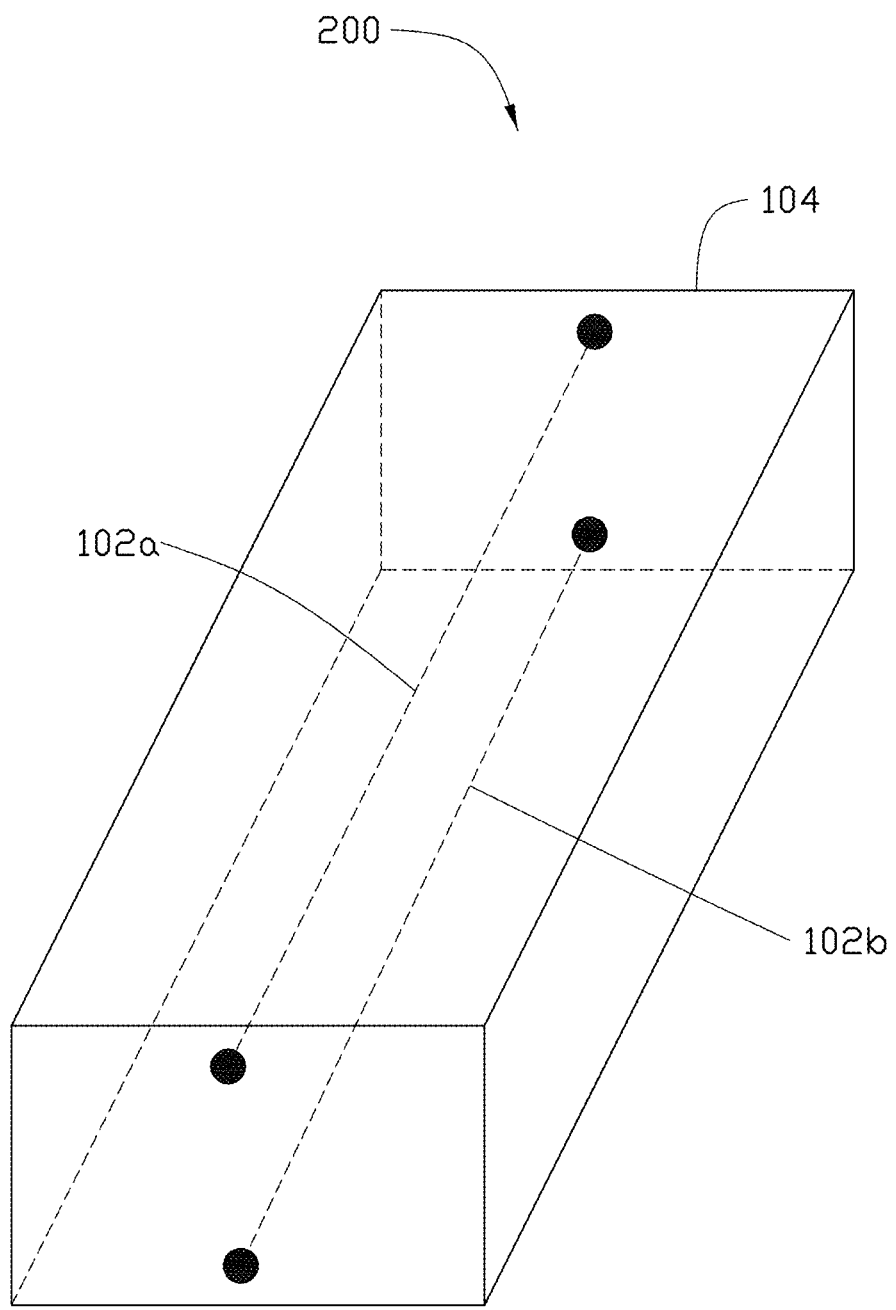
FIG. 3 is a schematic view of another embodiment of a detecting element of the mass flowmeter of FIG. 1.

Referring to FIG. 3, the support structure 104 also may be a frame structure. The support structure 104 comprises four side plates. The four side plates are connected together to form the frame structure. Both ends of the first sensing element 102a and both ends of the second sensing element 102b are respectively fixed to the opposite side plates of the frame structure. The first sensing element 102a and the second sensing element 102b are connected with an external circuit through a connection wire (not shown) located inside of the support structure 104. The specific configuration of the support structure 104 is not limited to the above two cases, as long as the first sensing element 102a and the second sensing element 102b may be suspended by the support structure 104, the first sensing element 102a and the second sensing element 102b can be connected with the external circuit.

Figure 4:
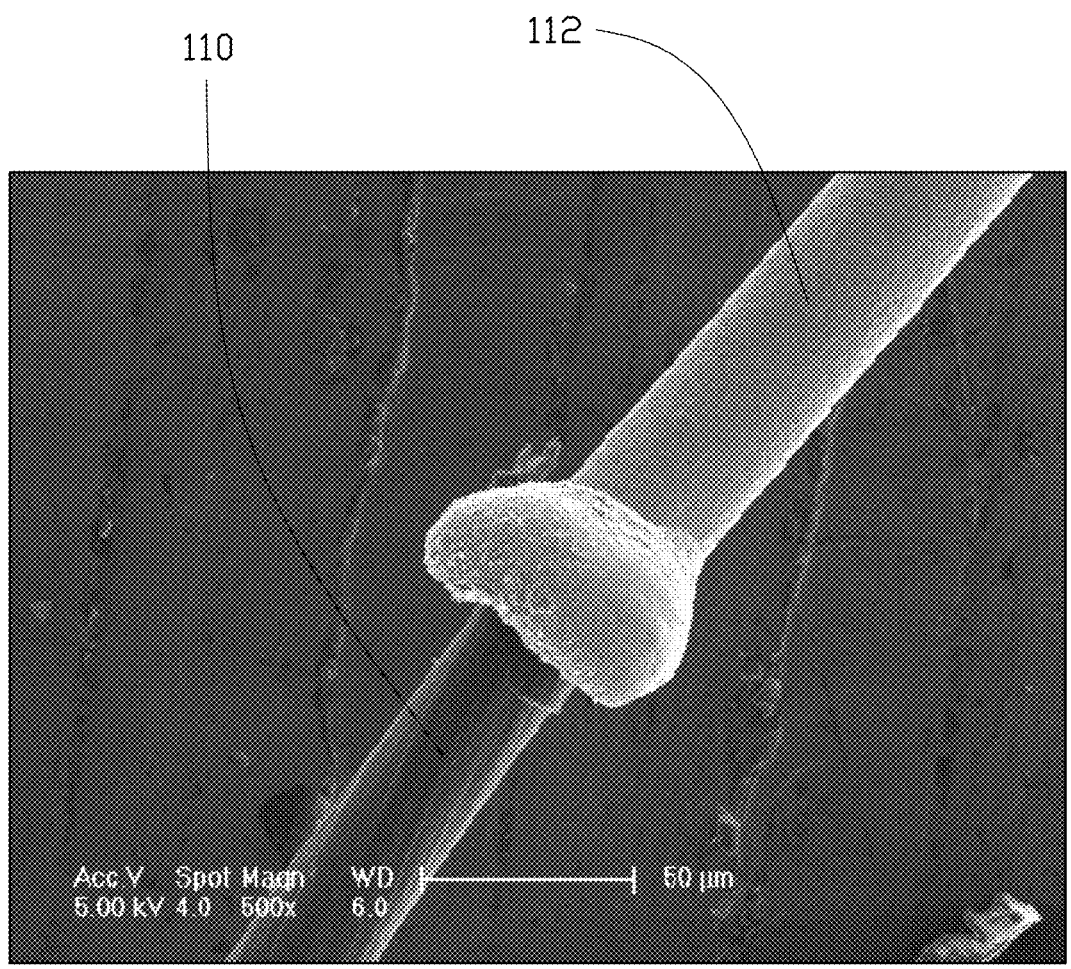
FIG. 4 is a scanning electron microscope (SEM) image of a carbon nanotube composite wire.

Referring to FIG. 4, the first sensing element 102a comprises a carbon nanotube composite wire, and the second sensing element 102b comprises a carbon nanotube composite wire. In one embodiment, the first sensing element 102a consists of a carbon nanotube composite wire, and the second sensing element 102b consists of a carbon nanotube composite wire. A diameter of the carbon nanotube composite wire is from 150 nanometers to 40 micrometers. The carbon nanotube composite wire comprises a carbon nanotube wire 110, sometimes referred to as a carbon nanotube yarn, and a metal layer 112 coated on a surface of the carbon nanotube wire 110.

The carbon nanotube wire 110 comprises a plurality of carbon nanotubes spirally arranged along an axial direction of the carbon nanotube wire 110. In one embodiment, the carbon nanotube wire 110 consists of a plurality of carbon nanotubes spirally arranged along an axial direction of the carbon nanotube wire 110. The carbon nanotube wire 110 is formed by twisting a carbon nanotube wire. The plurality of carbon nanotubes are secured together by van der Waals force. The carbon nanotube wire can be drawn from a carbon nanotube film. In one embodiment, the carbon nanotube wire can be twisted clockwise to form an S-twist; in another embodiment, the carbon nanotube wire can be twisted counterclockwise direction to form a Z-twist. The plurality of carbon nanotubes are secured together by van der Waals force. The carbon nanotube wire 110 is formed by twisting a carbon nanotube film. The carbon nanotube film can be drawn from a carbon nanotube array. The carbon nanotube film comprises a plurality of carbon nanotubes parallel with each other. In one embodiment, the carbon nanotube film can be twisted clockwise to form an S-twist; in another embodiment, the carbon nanotube film can be twisted counterclockwise direction to form a Z-twist. The plurality of carbon nanotubes in the carbon nanotube film are substantially oriented along an axial direction of the carbon nanotube film, and joined end-to-end by van der Waals force in the axial direction of the carbon nanotube film. Therefore when the carbon nanotube film is twisted, the plurality of carbon nanotubes in the carbon nanotube wire 110 are spirally arranged along the axial direction, joined end to end by van der Waals force along an extended direction of the plurality of carbon nanotubes.

During the twisting process of the carbon nanotube wire, a space between adjacent carbon nanotubes becomes smaller along the axial direction of the carbon nanotube wire, and a contact area between the adjacent carbon nanotubes increases. Therefore, in the axial direction of the carbon nanotube wire 110, the van der Waals force between the adjacent carbon nanotubes is increased, and adjacent carbon nanotubes in the carbon nanotube wire 110 are closely connected. In one embodiment, the space between adjacent carbon nanotubes in the axial direction of the carbon nanotube wire 110 is less than 10 nm. In one embodiment, the space between adjacent carbon nanotubes in the axial direction of the carbon nanotube wire 110 is less than 5 nm. In another embodiment, the space between adjacent carbon nanotubes in the axial direction of the carbon nanotube wire 110 is less than 1 nm. Since the space between adjacent carbon nanotubes in the axial direction of the carbon nanotube wire 110 is small, and the adjacent carbon nanotubes are closely connected by van der Waals force, the surface of the carbon nanotube wire 110 is smooth and has a high density. Since the carbon nanotube wire 110 has a smooth and dense surface structure, the metal layer 112 and the carbon nanotube wire 110 can form a close bond.

During the twisting process of the carbon nanotube film, a space between adjacent carbon nanotubes will becomes smaller along the axial direction of the carbon nanotube film, and a contact area between the adjacent carbon nanotubes will increase. Therefore, in the axial direction of the carbon nanotube wire 110, the van der Waals force between the adjacent carbon nanotubes is increased, and the adjacent carbon nanotubes in the carbon nanotube wire 110 are closely connected. In one embodiment, the space between adjacent carbon nanotubes in the axial direction of the carbon nanotube wire 110 is less than 10 nm. In one embodiment, the space between adjacent carbon nanotubes in the axial direction of the carbon nanotube wire 110 is less than 5 nm. In another embodiment, the space between adjacent carbon nanotubes in the axial direction of the carbon nanotube wire 110 is less than 1 nm. Since the space between adjacent carbon nanotubes in the axial direction of the carbon nanotube wire 110 is small, and adjacent carbon nanotubes are closely connected by van der Waals force, the surface of the carbon nanotube wire 110 is smooth and has a high density. Since the carbon nanotube wire 110 has a smooth and dense surface structure, the metal layer 112 and the carbon nanotube wire 110 can form a close bond.

A diameter of the carbon nanotube wire 110 ranges from about 50 nanometers to about 30 micrometers. A twist of the carbon nanotube wire 110 ranges from about 10 t/cm (turns per centimeter) to about 300 t/cm. The twist is the number of turns per unit length of the carbon nanotube wire. With an increase in the twist, the space between adjacent carbon nanotubes in the axial direction of the carbon nanotube wire 110 is reduced, and an attractive force between adjacent carbon nanotubes will increase. However, when the increase in the twist becomes too large, the attractive force between adjacent carbon nanotubes will be reduced. Thus, a predetermined twist, to the optimal diameter, gives the carbon nanotube wire 110 excellent mechanical properties.

When the diameter of the carbon nanotube wire 110 is less than 10 micrometers, the twist of the carbon nanotube wire 110 ranges from about 250 t/cm to about 300 t/cm. When the diameter of the carbon nanotube wire 110 ranges from about 10 micrometers to about 20 micrometers, the twist of the carbon nanotube wire 110 ranges from about 200 t/cm to about 250 t/cm. When the diameter of the carbon nanotube wire 110 ranges from about 25 micrometers to about 30 micrometers, the twist of the carbon nanotube wire 110 ranges from about 100 t/cm to about 150 t/cm. The mechanical strength of the carbon nanotube wire 110 is 5 to 10 times stronger than the mechanical strength of gold wire of the same diameter. In one embodiment, the diameter of the carbon nanotube wire 110 is about 25 micrometers, and the twist of the diameter of the carbon nanotube wire 110 is about 100 t/cm.

The metal layer 112 is uniformly coated on the outer surface of the carbon nanotube wire 110. A thickness of the metal layer 112 ranges from about 50 nanometers to about 5 micrometers. When the thickness of the metal layer 112 ranges from about 1 micrometer to about 5 micrometers, the conductivity of the carbon nanotube composite wire can reach 50% or more of the conductivity of the metal layer 112. When the thickness of the metal layer 112 is too small, for example less than 1 micrometer, the electrical conductivity of carbon nanotube composite wire is not significantly improved. On the contrary, the metal layer 112 will be easily oxidized, and the conductivity and life of the carbon nanotube composite wire will be further reduced. In addition, experiments show that when the thickness of the metal layer 112 is greater than a certain value, for example greater than 5 micrometers, the conductivity of the carbon nanotube composite wire does not significantly increase along with the increase of the diameter of the carbon nanotube composite wire.

The material of the metal layer 112 may be a metal or metal alloy with good conductivity, such as gold, silver, or copper. In one embodiment, the material of the metal layer 112 is copper, the thickness of the metal layer 112 is about 5 micrometers. The conductivity of the carbon nanotube composite wire can reach $4.39 \times 10^7$ S/m, the conductivity of the carbon nanotube composite wire is about 75% of the conductivity of copper metal.

Figure 5:
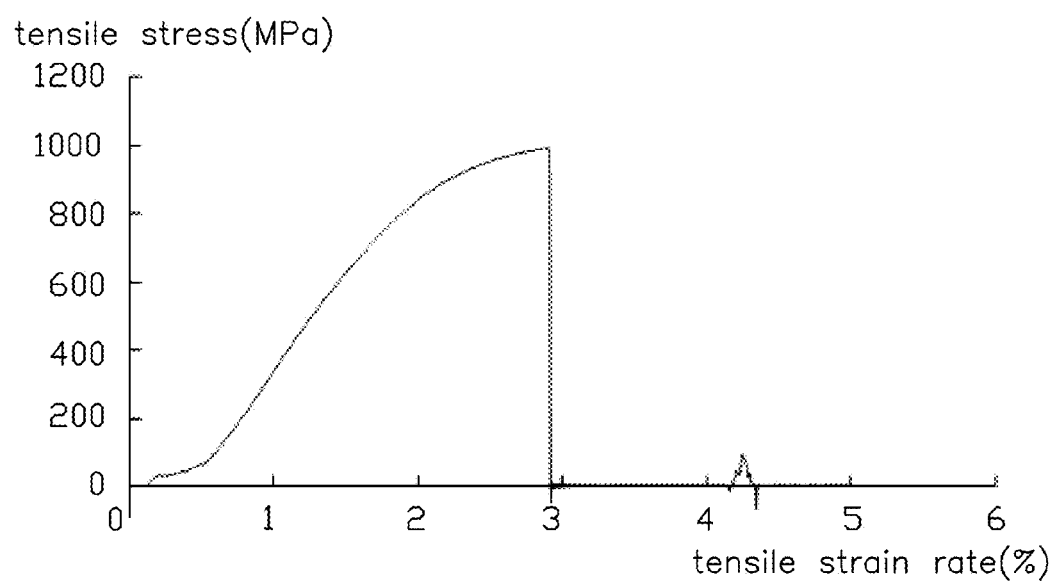
FIG. 5 is a tensile stress chart of the carbon nanotube composite wire of FIG. 4.

FIG. 4 illustrates that one embodiment in which the diameter of the carbon nanotube composite wire is about 35 micrometers. FIG. 5 illustrates that tensile stresses on an embodiment of the carbon nanotube composite wire can reach 900 MPa or more, this being 9 times of that of the gold wire with same diameter. FIG. 5 further shows that a tensile strain rate of the carbon nanotube composite wire is about 3%.

The metal layer 112 can be coated on the outer surface of the carbon nanotube wire 110 by electroplating, electroless plating, or by vapor deposition method.

The material of the first sensing element 102a and the second sensing element 102b should have strength and a good corrosion resistance. The first sensing element 102a and the second sensing element 102b can be made as thin as possible, to ensure that the hot wire 102 not only has a high sensitivity, signal to noise ratio, and frequency response, but also has good stability. The carbon nanotube composite wire has good mechanical and mechanical properties when the diameter and twist of the carbon nanotube wire 110, and the thickness of the metal layer, are optimized.

The mass flowmeter of the present embodiment has the following advantages. First, since the thickness of the metal layer ranges from about 50 nanometers to about 5 micrometers, the metal layer has good oxidation resistance and durability. Second, the diameter of the carbon nanotube wire ranges from about 50 nanometers to about 30 micrometers, and the thickness of the metal layer ranges from about 50 nanometers to about 5 micrometers. Therefore, the diameter of the carbon nanotube composite wire can be in nano-scale. When the carbon nanotube composite wire is used as the sensing element, the diameter of the sensing element itself can also be in nano-scale, resulting the sensing element having high sensitivity and frequency response. Third, when the carbon nanotube composite wire is used, because the carbon nanotube has good heat resistance, even if the metal layer is fused by a high temperature, the carbon nanotube wire will not easily break, which allows the carbon nanotube composite wire to maintain an electrical connection. Therefore, the durability of the sensing element and the mass flowmeter can be improved, and the life of the sensing element and the mass flowmeter are also increased.

In using the mass flowmeter 100, the detecting element 200 is positioned so that the first sensing element 102a and the second sensing element 102b are placed in the test flow field. When the first sensing element 102a passes a small current, the first sensing element 102a is not heated because the current is small. Therefore, the temperature of the first sensing element 102a is equal to the temperature of the fluid. When the second sensing element 102b passes a large current, the second sensing element 102b is heated. Therefore, the temperature of the second sensing element 102b is higher than the temperature of the fluid. When the fluid flows, the heat of the second sensing element 102b is taken away and lost, and the temperature of the second sensing element 102b is changed, so that the resistance value of the second sensing element 102b is changed. Since the first sensing element 102a and the second sensing element 102b are electrically connected with the signal receiving 300, the change of the resistance value of the second sensing element 102b will generate a bridge circuit imbalance. The bridge circuit imbalance is equivalent to a signal which is passed from the detecting element 200 to the signal receiving element 300. The signal receiving element 300 transfers the signal to the signal processing element 400. The signal processing element 400 performs calculations on the signal to obtain the flow rate, and displays the flow rate by the display device 500.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A mass flowmeter comprising:
   a detecting element;
   a signal receiving element; and
   a signal processing element;
   wherein the detecting element, and the signal receiving element, and the signal processing element are electrically connected with each other; the detecting element comprises a first sensing element and a second sensing element, each of the first sensing element and the second sensing element comprise a carbon nanotube composite wire; the carbon nanotube composite wire comprises a carbon nanotube wire and a metal layer; the carbon nanotube wire comprises a plurality of carbon nanotubes spirally arranged along an axial direction of the carbon nanotube wire, a diameter of the carbon nanotube wire ranges from about 50 nanometers to about 30 micrometers, a twist of the carbon nanotube wire ranges from about 10 r/cm to about 300 r/cm; and the metal layer is coated on a surface of the carbon nanotube wire, and a thickness of the metal layer ranges from about 50 nanometers to about 5 micrometers.

2. The mass flowmeter of claim 1, wherein the first sensing element and the second sensing element are parallel with and spaced from each other.

3. The mass flowmeter of claim 1, wherein the detecting element further comprises four conductive support rods and a support substrate, the four conductive support rods are supported by the support substrate, and each of the first sensing element and the second sensing element is supported by two conductive support rods.

4. The mass flowmeter of claim 3, wherein each of the four conductive support rods comprises a first end and a second end, four second ends of the four conductive support rods are disposed on the support substrate, four first ends of the four conductive support rods extend out from the support substrate, two ends of the first sensing element are respectively fixed by two first ends of two conductive support rods, and two ends of the second sensing element are respectively fixed by two first ends of another two conductive support rods.

5. The mass flowmeter of claim 1, wherein the detecting element further comprises a frame structure, the frame structure comprises four side plates, the first sensing element and the second sensing element are respectively fixed to the frame structure and suspended via the frame structure.

6. The mass flowmeter of claim 1, wherein the diameter of the carbon nanotube composite wire is less than 10 micrometers.

7. The mass flowmeter of claim 1, wherein the diameter of the carbon nanotube wire is less than 10 micrometers, and the twist of the carbon nanotube wire ranges from about 250 r/cm to about 300 r/cm.

8. The mass flowmeter of claim 1, wherein the diameter of the carbon nanotube wire ranges from about 25 micrometers to about 30 micrometers, and the twist of the carbon nanotube wire ranges from about 100 r/cm to about 150 r/cm.

9. The mass flowmeter of claim 1, wherein the plurality of carbon nanotubes are secured together by van der Waals force.

10. The mass flowmeter of claim 9, wherein a space between adjacent carbon nanotubes in the axial direction of the carbon nanotube wire is less than 10 nanometers.

11. The mass flowmeter of claim 9, wherein a space between adjacent carbon nanotubes in the axial direction of the carbon nanotube wire is less than 5 nanometers.

12. The mass flowmeter of claim 1, the plurality of carbon nanotubes in the carbon nanotube wire are joined end to end by van der Waals force along an extended direction of the plurality of carbon nanotubes.

13. The mass flowmeter of claim 1, a material of the metal layer is copper, and the thickness of the metal layer is about 5 micrometers.

* * * * *